(No Model.)
E. S. GIBBS & E. HARPER.
CHURN.
No. 378,501. Patented Feb. 28, 1888.
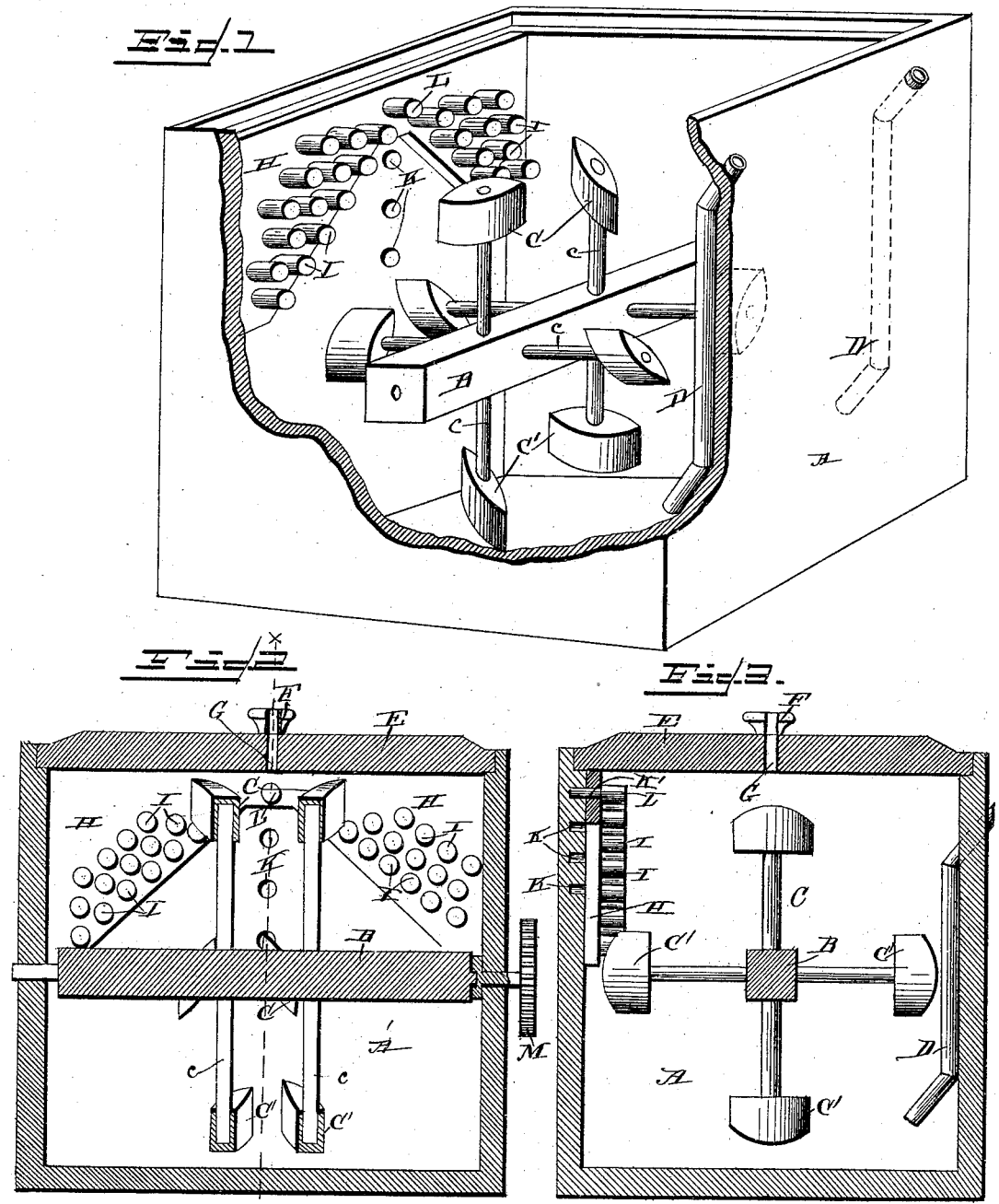
Witnesses
M.H.Pumphrey.
E. E. Doyle.
Inventors,
Eugene S. Gibbs and
Edward Harper.
by C. A. Snow & Co.
Attorneys.

UNITED STATES PATENT OFFICE.

EUGENE SHEPARD GIBBS AND EDWARD HARPER, OF LYONS, IOWA.

CHURN.

SPECIFICATION forming part of Letters Patent No. 378,501, dated February 28, 1888.

Application filed September 2, 1887. Serial No. 248,611. (No model.)

*To all whom it may concern:*

Be it known that we, EUGENE SHEPARD GIBBS and EDWARD HARPER, citizens of the United States, residing at Lyons, in the county of Clinton and State of Iowa, have invented new and useful Improvements in Churns, of which the following is a specification.

Our invention relates to improvements in churns; and it consists in a certain novel construction and arrangement of parts, fully set forth hereinafter, and specifically pointed out in the claim.

In the drawings, Figure 1 is a perspective view of the churn with one side broken away to show the interior construction. Fig. 2 is a section taken longitudinally of the shaft carrying the beaters. Fig. 3 is a section on the line x x of Fig. 2.

Referring by letter to the drawings, A designates the body of the churn, in which is journaled the shaft B, carrying the beaters C C, comprising the rods or shanks c and the heads C' on the outer ends of the shanks.

D D designate small flues or pipes passing up on one side of the body A, the lower ends thereof being close to the bottom of the body, while the upper ends pass through the sides thereof close to the top.

E designates the lid of the churn, provided at the center with the handle or knob F, in which is formed a perforation to align with a perforation, G, in the lid.

H designates a plate arranged on the opposite side of the churn-body from the pipes D D, and it extends entirely across the side of the body.

I I represent pins arranged on the said plate, which extend outwardly and tend to break the globules of cream as they are thrown against them by the action of the beaters.

K K designate a series of perforations or sockets in the side of the churn, at the center thereof, and K' is a perforation in the center of the plate H, adapted to be aligned with either of the perforations.

L represents a movable pin adapted to be passed through the perforation K' and into any one of the perforations K, to secure the plate at any desired point. The lower edge of the plate is adapted to be placed at about the height of the milk in the body, so that the beaters, which are adapted to ascend on the side of the body to which the breaker-plate is attached, dash the cream violently against the pins I and cause the butter to be rapidly separated. By making the plate H vertically adjustable it may be suited to the quantity of milk in the body. The outer end of the shaft B, which is journaled in the sides of the body, is provided with a gear-wheel, M, adapted to mesh with a gear-wheel operated by any suitable or preferred power to rotate the said shaft.

The object in providing the pipes D D is as follows: As the dasher is rapidly revolving, the milk is drawn away from the lower ends of the said pipes, and consequently air is drawn down the same. The said air mixes with the milk, and, aiding in the formation of acid, causes the butter to be more readily and quickly separated from the milk; also, the air tends to carry off impurities from the milk, and thus render the butter sweeter, the air, after passing through the contents of the body, escaping through the perforation G in the lid.

Having thus described our invention, we claim—

In a churn, the combination, with the body A, having a series of perforations, K, arranged in a vertical line on one side thereof, and the revolving dasher journaled in the body, of the breaker-plate H, having a central opening, K', to align with either of the perforations K, the pin L, to pass through the perforation K' and one of the perforations K, to secure the plate at the desired elevation, and the pins I I on the said plate, arranged substantially as and for the purpose specified.

In testimony that we claim the foregoing as our own we have hereto affixed our signatures in presence of two witnesses.

EUGENE SHEPARD GIBBS.
  EDWARD HARPER.

Witnesses:
  D. ROMER,
  W. M. NUGENT.